June 12, 1945.    A. F. HICKMAN    2,377,883
SPRING SUSPENSION FOR RAILROAD CAR BODIES
Filed Jan. 15, 1941    6 Sheets-Sheet 1
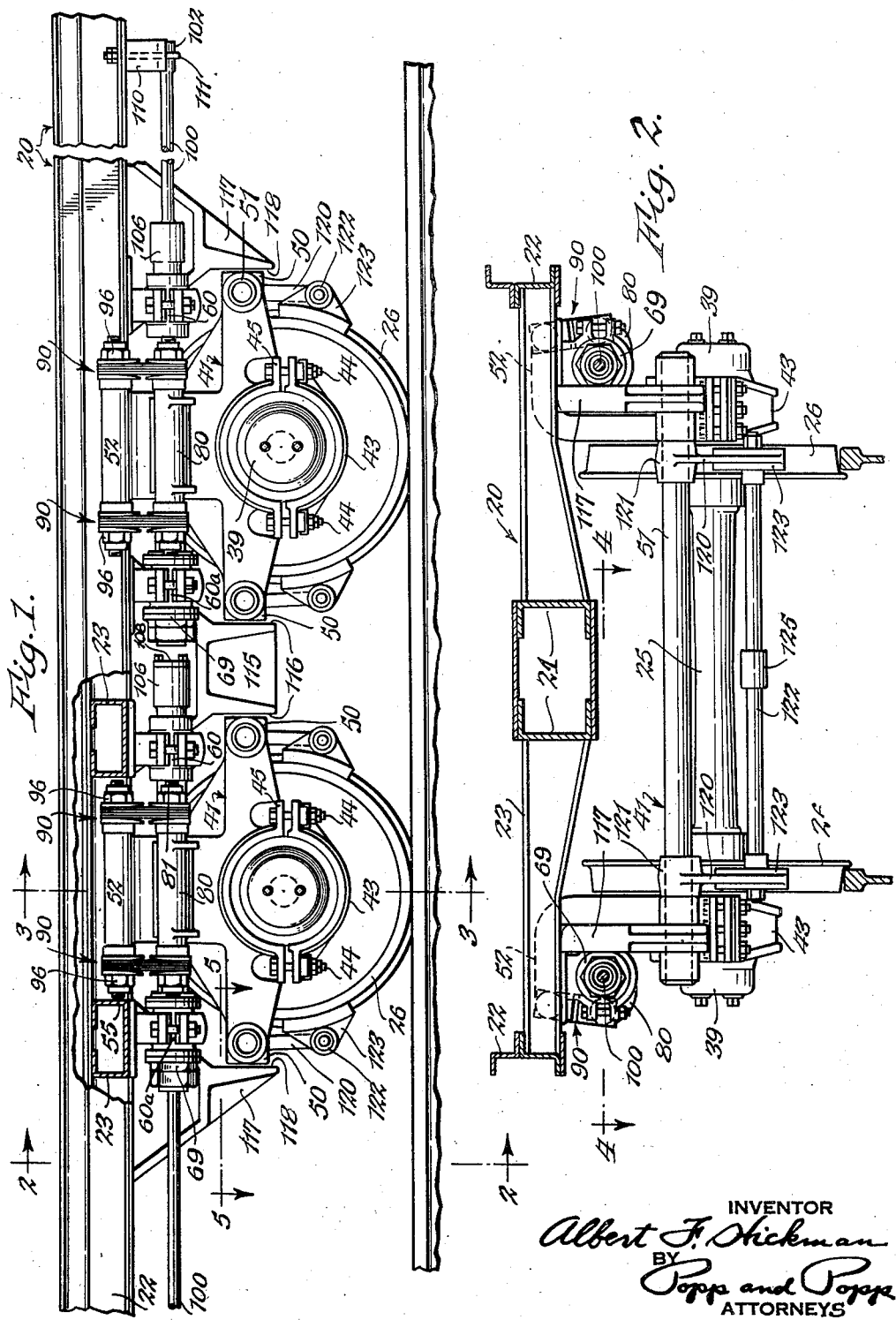
INVENTOR
Albert F. Hickman
BY
Popp and Popp
ATTORNEYS

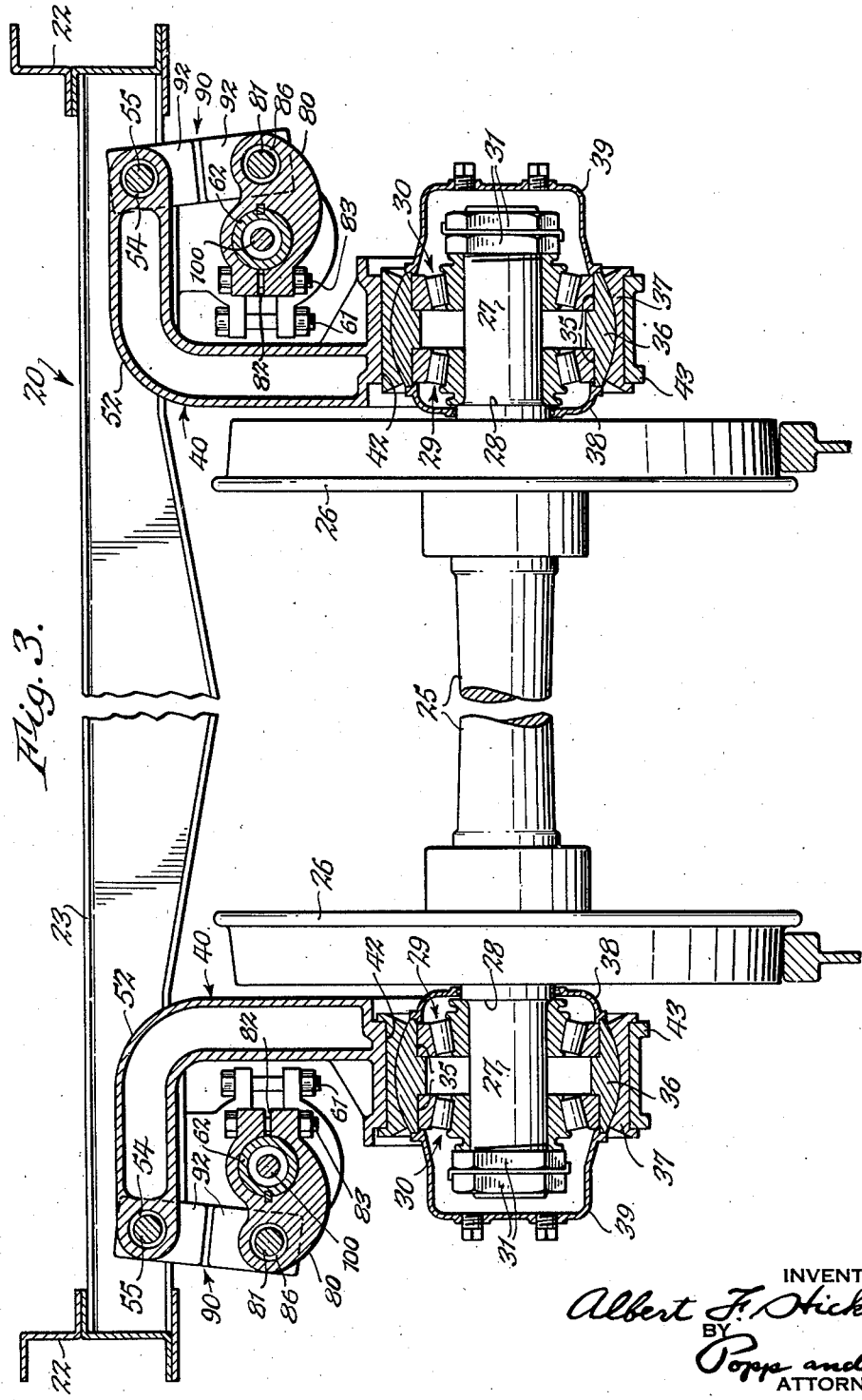

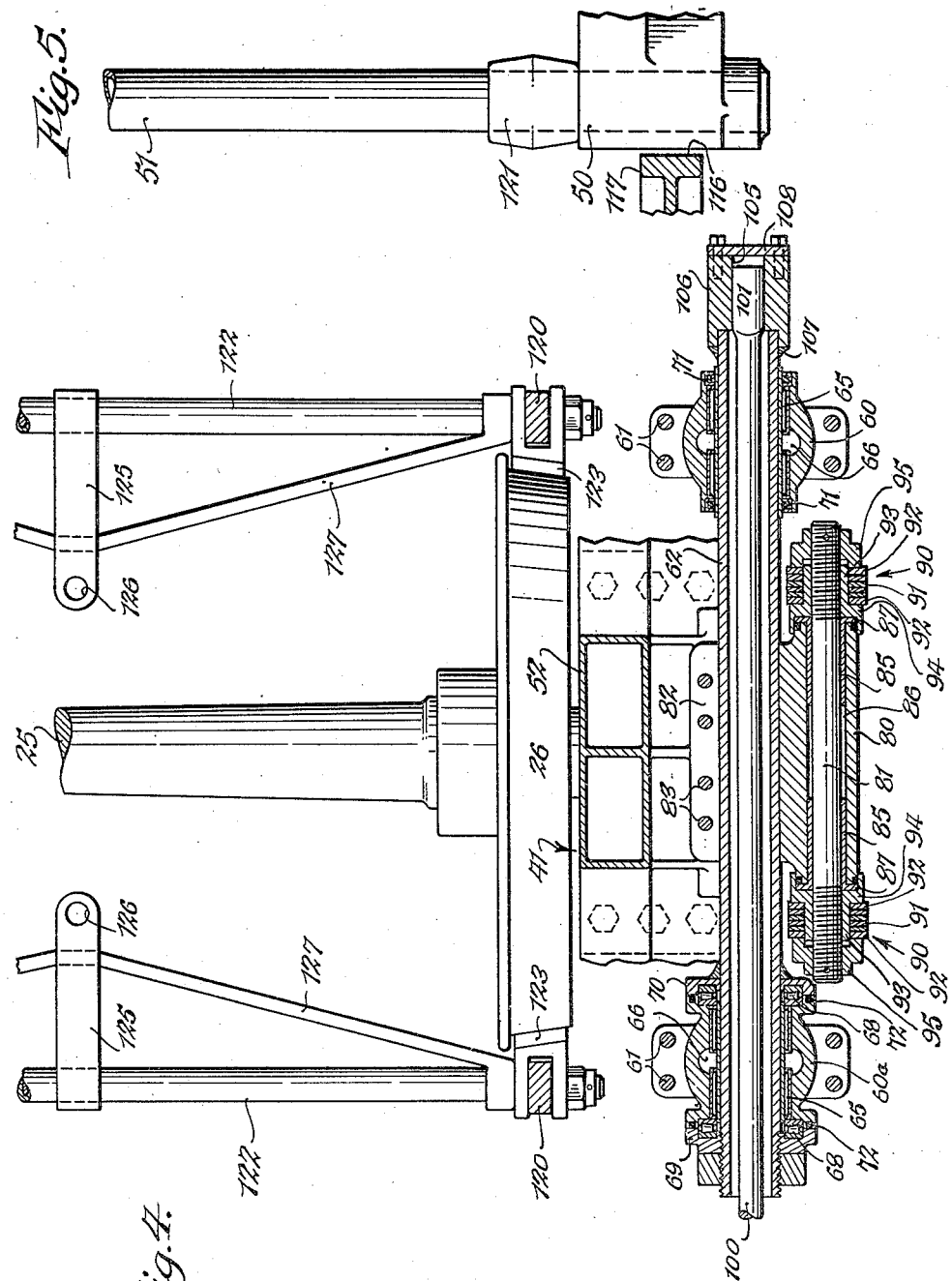

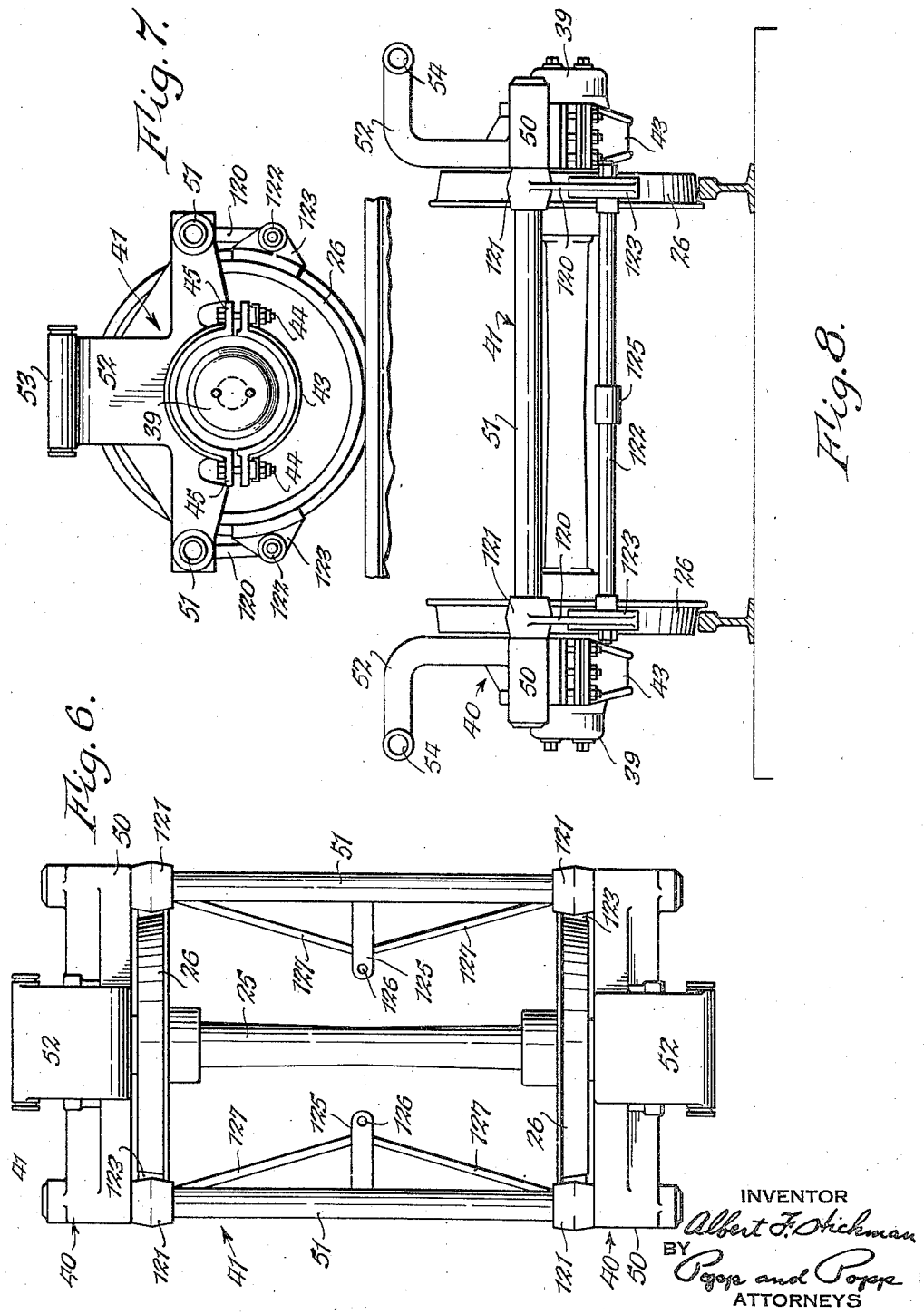

June 12, 1945. A. F. HICKMAN 2,377,883
SPRING SUSPENSION FOR RAILROAD CAR BODIES
Filed Jan. 15, 1941 6 Sheets-Sheet 5
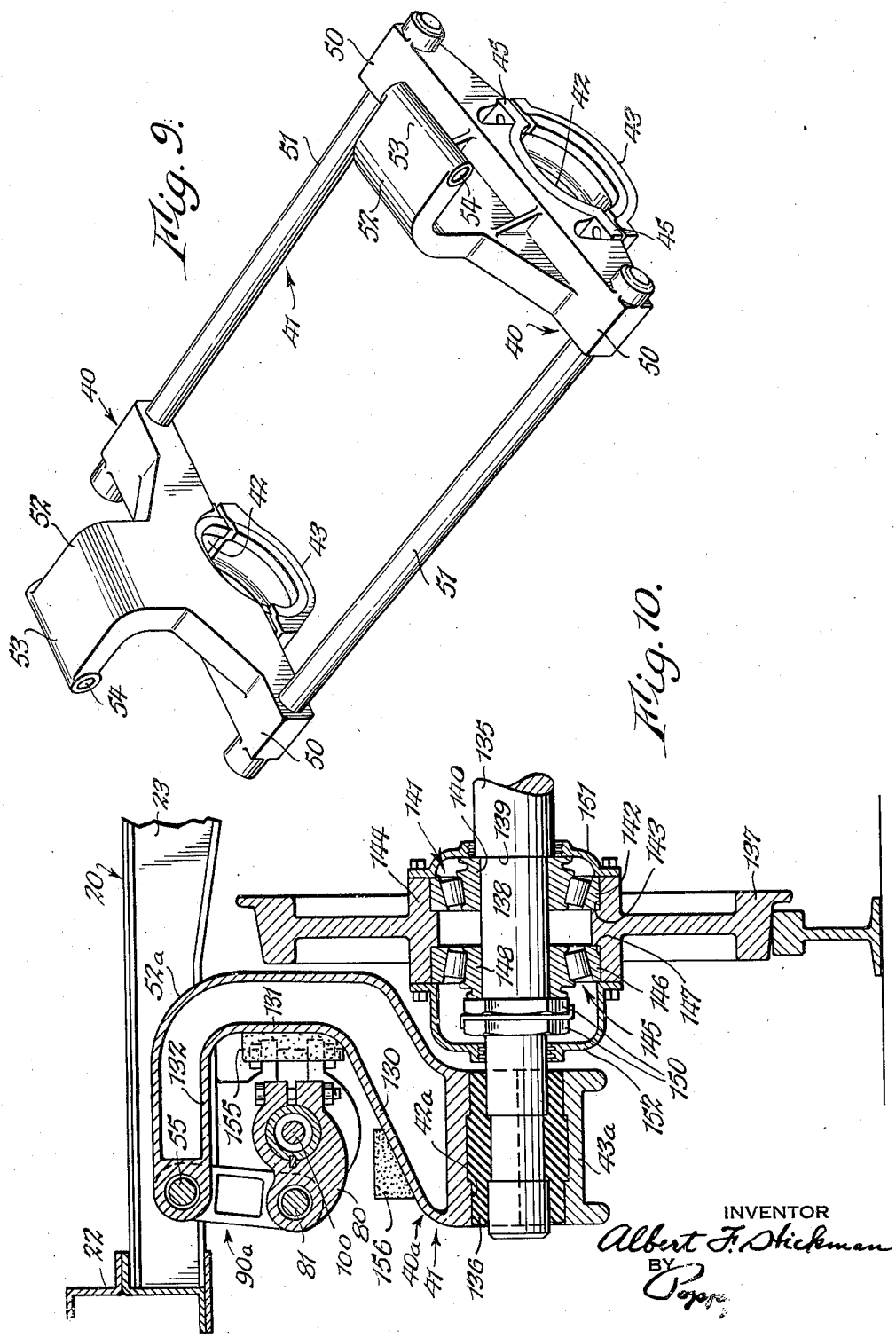
INVENTOR
Albert F. Hickman
BY

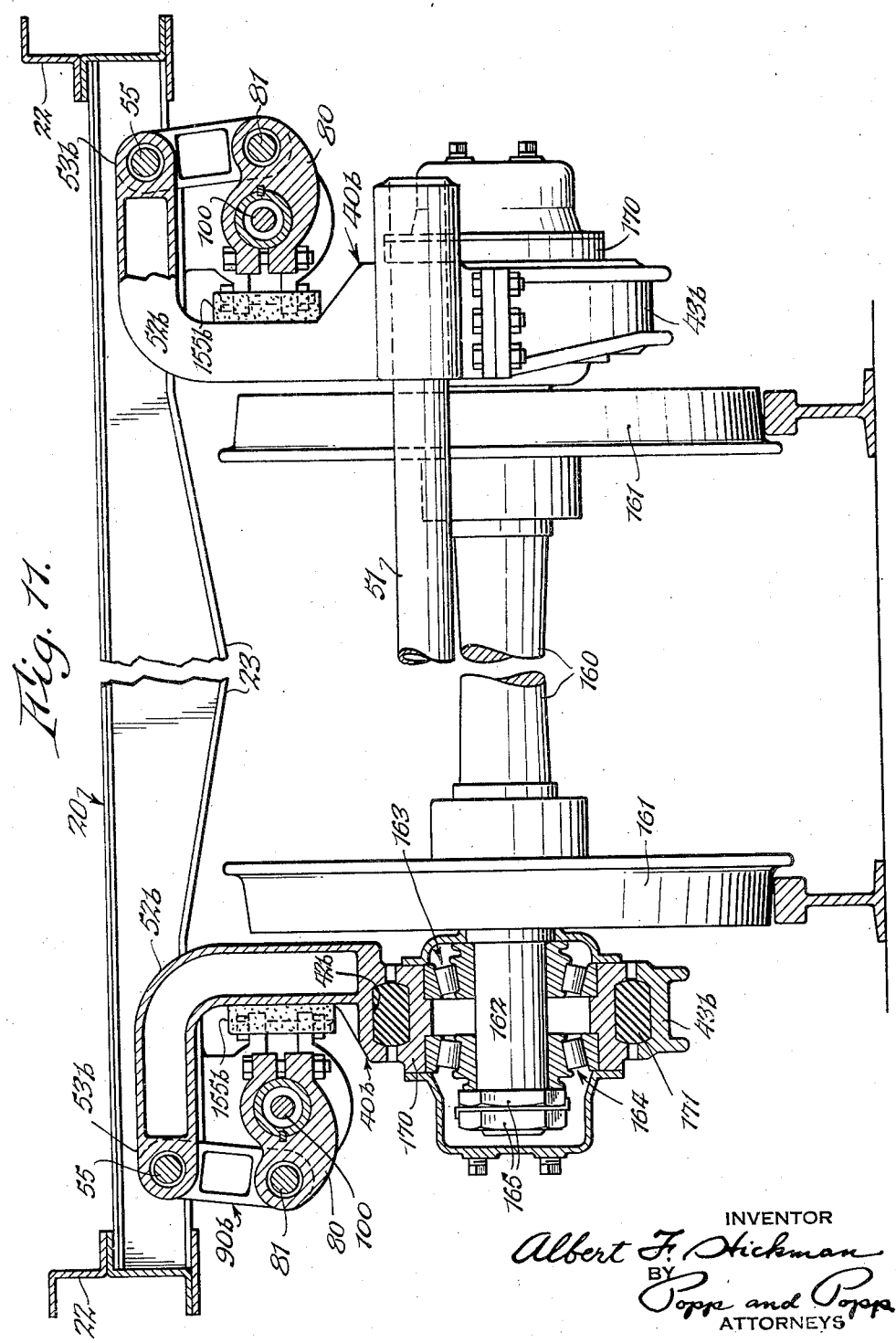

Patented June 12, 1945

2,377,883

UNITED STATES PATENT OFFICE 2,377,883

SPRING SUSPENSION FOR RAILROAD CAR BODIES

Albert F. Hickman, Eden, N. Y., assignor to Hickman Pneumatic Seat Co. Inc., Eden, N. Y., a corporation of New York Application January 15, 1941, Serial No. 374,516

9 Claims. (Cl. 105—171)

This invention relates to a spring suspension for railroad cars and more particularly to such a spring suspension particularly adapted for supporting the body of a car of a passenger train where speed of travel, safety, comfort and stability are of prime importance.

This application is a companion to my copending application for Spring suspension for railroad cars, Serial No. 374,515, filed of even date herewith and is a continuation in part of my copending application for Vehicle spring suspension, Serial No. 713,161, filed February 27, 1934.

One of the principal objects of this invention is therefore to provide a spring suspension for railroad cars which will function to safely support the car body at the high speeds required in passenger train service, the spring suspension forming the subject of this invention being designed for speeds in excess of 100 miles per hour.

Another object of the invention is to provide such a spring suspension for the cars of passenger trains which has the necessary features of safety both against breakage and also to insure the car being solidly supported on the tracks at all rail speeds.

Another object is to provide such a spring suspension for the cars of passenger trains which provides the necessary stability for passenger car service and also provides the desirable comfortable riding qualities.

Another object of the invention is to provide a spring suspension in which both up and down wheel movement is resiliently opposed by a purely geometric resilient resistance instead of by an arithmetic or a partially arithmetic and partially geometric resilient resistance.

Another object of the invention is to provide such a spring suspension which provides for the lateral cushioning of the car body as well as its vertical cushioning thereby to absorb lateral impacts imposed upon the car body as well as vertical impacts.

Another object of the invention is to provide such a spring suspension having high and wide spring suspension pivot positions. By the high and wide suspension pivot positions of the present invention stability is increased and the need for anti-body roll devices, such as torsion bar stabilizers, is eliminated. By eliminating these anti-roll devices the same frequencies can be maintained regarding body roll as are developed for vertical movements.

Another object of the invention is to provide such a spring suspension which is itself light in weight and also is adapted to be used in conjunction with light-weight bodies and equipment, such light-weight bodies and equipment being desirable with the use of increased rail speeds.

Another object of the invention is to provide such a spring suspension which can be interposed directly between the wheels of the car and its body without the use of conventional swivel trucks.

Another object of the invention is to provide such a suspension which will support the car body in such manner that zero side sway and even a slight negative sway control can be provided even with the high centers of gravities of conventional passenger car bodies.

Another object of the invention is to provide such a spring suspension having many operating economies, such as the saving of fuel; the saving in wear of the tracks and wheels; and the saving in the cost of maintenance of the car bodies.

Another object of the invention is to provide such a suspension in which the friction in the spring suspension can be reduced to any desired degree, this object being attained by the use of torsion rods as the resilient means with provision for holding the stress upon these torsion rods low enough to develop extremely long life with very light rods.

Another object of the invention is to provide such a spring suspension which can incorporate large oversized bearings and large grease reservoirs and grease retainers to insure long life.

Another object is to provide such a spring suspension which does not incorporate axle compensation, axle compensation involving the use of devices to distribute the load to the two or more axles supporting each end of the car. By eliminating axle compensation the weight of the suspension is materially reduced; parts are eliminated; effective spring centers wider than the track can be developed to permit the use of softer springs and thereby obtain improved ride characteristics; and high and wide suspension pivot positions can be employed thereby to obtain increased stability and better side sway or body roll control without extra devices.

Another object of the invention is to provide such a suspension which is provided with resilient means whereby each axle is permitted to move a slight distance longitudinally of the car body thereby to resiliently resist unusually violent longitudinal impacts such as might occur in applying the brakes and in coupling cars. This longitudinal resilient flexibility can also be used to overcome wheel tramp frequencies should it become a factor in any particular designs.

Another object of the invention is to provide means for positively limiting such movement of each axle longitudinally of the car body to prevent overstressing of the resilient means and undue displacement of the axle, such means comprising bumpers provided on the car body.

Another object of the invention is to provide such a suspension in which the wheels can be mounted for independent rotation on the axles thereby to avoid wheel tramp and wheel and track wear and secondary flanges which result, to a large extent, through the wheel slippage caused by the wheels being fixed to the axles.

Another object of the invention is to provide such a spring suspension in which each entire axle assembly can be readily removed as a unit.

Another aim of the invention is to provide an independent axle type of spring suspension in which the pair of wheels carried by any one axle can leave the rails without causing serious mishaps.

Another object of the invention is to reduce to a minimum the unsprung weight of the suspension.

Another object of the invention is to provide such a suspension which eliminates wheel hop and wheel tramp.

Other advantages and objects of the invention will be readily apparent from the following description and the accompanying drawings, wherein:

Fig. 1 is a side elevation of one end of a passenger railroad car and showing a suspension embodying one form of my invention.

Figs. 2 and 3 are vertical transverse sections taken on the correspondingly numbered lines of Fig. 1, Fig. 3 being somewhat enlarged.

Fig. 4 is a fragmentary horizontal section taken generally on line 4—4, Fig. 2.

Fig. 5 is a fragmentary horizontal section taken on line 5—5, Fig. 1.

Fig. 6 is a top plan view of one of the axle, wheel and cradle assemblies forming part of the independent axle suspension shown in Figs. 1-5.

Fig. 7 is an end elevation of the axle, wheel and cradle assembly shown in Fig. 6.

Fig. 8 is a side elevation of the axle, wheel and cradle assembly shown in Figs. 6 and 7.

Fig. 9 is a perspective view of the cradle of the axle, wheel and cradle assembly shown in Figs. 6-8.

Fig. 10 is a fragmentary, vertical, transverse section similar to Fig. 3 and showing a modified form of the independent axle suspension shown in Figs. 1-9.

Fig. 11 is a view similar to Figs. 3 and 10 and showing a further modified form of the independent axle suspension shown in Figs. 1-9.

Passenger cars of limited length, as for example, cars 40 feet or less in length, do not require horizontal angular freedom of the axles in relation to the car bodies, such as is provided by the swivel truck shown in my said companion application for Spring suspension for railroad cars, for tracking, provided sufficient flexibility is available for lateral movement of the axles across the car. However, this lateral freedom must be held down to limits of around 2 inches because of the present station platforms, tunnels, etc. For such passenger cars the independent non-swiveling axle suspension forming the subject of the present invention can be employed.

Such passenger cars can either be made as separate units or the cars can be made 80 feet in length of two 40 foot sections jointed or hinged vertically in the center so as to provide an 80 foot car with 40 foot tracking characteristics and ability. In the latter case each section of the car would be supported at its opposite ends on one or more independent axle suspensions forming the subject of the present invention.

In the form of the invention shown in Figs. 1-9, the underframe 20 is shown as comprising a center sill 21, side sills 22 and body bolsters 23 of any suitable form. Each end of the underframe is shown as being carried by a pair of tandem axles 25 and in this form of the invention the flanged car wheels 26 are shown as being fast to the axles 25 as is now common practice with railroad car suspensions. The opposite ends of each axle 25 are reduced, as indicated at 27, to provide an annular shoulder 28 against which the inner race of an inner taper roller bearing 29 seats. Each reduced end 27 of each axle is also shown as carrying the inner race of an outer taper roller bearing 30 and nuts 31 are screwed onto the threaded ends of the axle and against the inner race of the outer taper roller bearings 30, as best shown in Fig. 3. The outer races of the companion inner and outer taper roller bearings 29 and 30 are fitted in internal recesses 35 of an inner spherical bearing ring 36, the peripheral face of which is of spherical form and fits the inner spherical face of an outer bearing ring 37. By this means it will be seen that the roller bearing at each end of the axle 25 is self alining. The roller bearings 29 and 30 are shown as protected against the entrance of dust and dirt by an inner cap ring 38 between the axle 25 and the inner bearing ring 36 and an outer hub cap 39 secured to the inner bearing ring 36 and enclosing the end of the axle.

The outer bearing ring 37 at each end of the axle supports the end heads 40 of a cradle 41 best shown in perspective in Fig. 9. For this purpose each end head 40 is formed on its underside to provide a semicircular socket 42 which fits around the upper half of the corresponding outer bearing ring 37, this outer bearing ring 37 being clamped in this socket 42 by a half round clamping block 43 which is clamped around the lower half of the outer bearing ring 37 by bolts 44 which extend through flanges 45 provided on the end heads 40 on opposite sides of its half round socket 42 or in any other suitable manner.

Each end head 40 is formed to provide two horizontal arms 50 which extend at right angles to the axle 25. The end heads 40 of each cradle 41 are rigidly connected by a pair of horizontal tubes 51, each tube being rigidly connected to the ends of the corresponding arms 50 of the end heads in any suitable manner. These tubes 51 extend parallel with the axle 25 supporting the cradle. Each end head 40 is also formed to provide an axle bracket 52 which extends upwardly and has a horizontally outward projecting upper end 53 which is provided at its outer extremity with a horizontal bore 54 which extends at right angles to the axle 25. An axle pivot pin 55 is journaled in this bore 54 of each axle bracket 52 in any suitable manner, the opposite ends of this axle pivot pin projecting from the axle bracket and being threaded.

To connect each axle bracket 52 with the underframe 20 of the passenger car body, a pair of horizontally spaced bearing heads 60, 60a are secured to the undersides of the body bolsters 23, by bolts 61 or in any other suitable manner, adjacent each end of each axle 25. Each pair of these bearing heads 60, 60a carries a horizontal tube 62 which is journaled at its opposite ends in these bearing heads and extends lengthwise of the passenger car body. Each of these bearing heads 60, 60a, as best shown in Fig. 4, is shown as carrying a pair of roller bearings 65 which are spaced from each other, and each bearing head is formed to provide an annular lubricant reservoir or chamber 66 between these roller bearings. The bearing head 60a is also shown as provided with a pair of roller thrust bearings 68 at its opposite ends, these roller thrust bearings being interposed between each end of the bearing head 60a and thrust collars 69, 70, one of which is screwed onto the end of the tube 62 and the other of which is welded to the tube 62. To prevent the escape of lubricant from these bearings, annular lubricant seals 71 of any suitable form are shown as provided in the opposite ends of the bearing head 60 around the tube 62 and similarly annular lubricant seals 72 are shown as provided between each bearing head 60a and each of the thrust collars 69 and 70.

To the tube 62 is clamped a lever or arm 80 which projects horizontally outward from the tube 62 and carries a pin 81 at its outer end. This lever arm is of substantial length lengthwise of the tube 62 and is shown as being split or bifurcated, as indicated at 82, to embrace and clamp around the tube 62. The free ends of the split or bifurcated portions of each lever arm 80 are shown as drawn together into firm clamping engagement with the tube 62 by a series of bolts 83, as best shown in Fig. 4. The opposite ends of the pin 81 are shown as journaled in bronze bushings 85 provided in the bore 86 which houses the pin 81 and the outer end of each of these bushings 85 is shown as provided with an annular end flange 87 which provides an end thrust bearing surface at the front and rear ends of the lever arm 80.

The opposite ends of the axle pivot pin 55 and the lever arm pivot pin 81 are connected by a pair of flexible shackles 90. These flexible shackles can be of the form shown in detail in my copending application, Serial No. 330,735, filed April 20, 1940, for Shackle for spring suspensions and are shown as comprising a plurality of metal leaves 91 held between a pair of shackle heads 92 at each end of the shackle and the leaves and shackle heads being provided with openings to permit of fitting the shackles over the ends of the pins 55 and 81. To secure the shackles to the ends of the lever arm pivot pin 81, each end of this pin 81 is shown as being threaded and a collar 93 having an inner annular flange 94 is screwed thereon. The flange 94 of each of these collars is adapted to engage the corresponding flange 87 of the adjacent bronze bushing 85 to prevent displacement of the shackles 90 lengthwise of the truck frame. The lower end of each shackle 90 is held against the corresponding end flange 94 of its collar 93 by a nut 95 applied to the adjacent threaded end of the lever arm pivot pin 81 and a similar nut 96 can be employed to secure the upper end of each shackle 90 to the corresponding end of the axle pivot pin 55. The shackles 90 extend upwardly and inwardly from the lever arm pivot pins 81 to the axle pivot pins 55, as best shown in Fig. 3. These shackles 90 are laminated so as to be flexible lengthwise of the car body. This permits the axle pivot pin 55 to move a short distance longitudinally relative to its companion lever arm pivot pin 81 and also to twist slightly. These flexible shackles thereby serve to cushion impacts longitudinally of the passenger car. This movement is limited by bumpers as hereinafter described.

The resilient connection between each end head 40 of each cradle 41 and the underframe 20 of the car body is shown as comprising a torsion rod 100, both the live end 101 and the dead end 102 of which is shown as being deformed or upset, as set forth in my Patent No. 2,213,004, dated August 27, 1940, into ovalled form in cross section.

To connect the torsion rods to the companion pair of cradle end heads 40, the live end of the torsion rod, shown at the left of Fig. 1, extends through the corresponding torsion tube, as best shown in Fig. 4, and its oval extremity at this live end fits into a similarly shaped bore 105 of a cylindrical head 106 which head is fitted around this tube 62 and can be welded thereto, as indicated at 107. The end of this cylindrical head 106 is shown as closed by a removable cap 108 which can be secured to the cylindrical head in any suitable manner. The live end of the companion torsion rod 100, shown at the right of Fig. 1, does not extend through its tube 62, but is secured directly in a cylindrical head 106 welded to the right hand end of the tube 62 as shown at the right of Fig. 1. This cylindrical head 106 for the torsion rod 100 at the right of Fig. 1 is identical with the cylindrical head 106 for the torsion rod 100 at the left of this figure, except that it is not, of course, provided with a removable cap 108. It will be seen that by this arrangement the torsion rods extend from their live ends in opposite directions. This arrangement of the live ends of each pair of torsion rods adjacent to each other with their dead ends projecting in opposite directions is for the purpose, of course, of providing torsion rods of adequate length without interference with each other in anchoring their dead ends to the car body.

Each of the torsion rods 100 is arranged to extend axially through its tube 62 and has its dead end 102 anchored in a block 110 which is secured to the underside of the corresponding side sill 22 by a U-bolt 111 which extends through the block 110. The underside of the block 110 is recessed to form, jointly with the rounding part of the U-bolt 111, an ovalled clamping opening which receives the ovalled dead end 102 of the torsion rod to anchor this dead end of the torsion rod against twisting.

As previously indicated, the movement of the axles longitudinally of the car body which is permitted by the flexibility of the shackles 90 is positively limited when the axles are subjected to unusual impacts longitudinally of the car as in the case of derailment of an axle or in the violent coupling of the cars of the train. For this purpose a central bumper block 115 is secured to the side sills 22 of the underframe of the car body between the pair of axles at each end of the passenger car. This bumper block 115 is formed to provide opposite bumper faces 116 which are arranged in closely spaced relation to the ends of the opposing arms 50 of the end heads 40 which form a part of the cradles 41 for the two axles. Similarly, a bumper block 117 is secured to the underframe of the car body on the opposite side of each cradle end head 40, these bumper blocks 117 having bumper faces 118 which are arranged in closely spaced relation to the end face of the adjacent arm 50 of each cradle end head 40. As best shown in Fig. 1, while the flexible shackles 90 yieldingly permit movement of the cradles 41 and axles 25 lengthwise of the car body under all normal conditions, any excessive movement is positively limited by the bumper blocks 115 and 117 which form a positive stop for the movement of the axles and cradles either forwardly or rearwardly.

Besides relieving the axles of excess bending stresses, caused by the wide suspension pivot mountings, the cradles 41 form a mounting for the brake mechanism. As best shown in Figs. 4 and 6-8 a brake hanger arm 120 is rotatably mounted at each end of each horizontal tube 61 of each cradle 41, the upper end of each of these hangers being enlarged, as indicated at 121, for this purpose. The lower ends of each pair of the brake hangers 120, as best shown in Figs. 4 and 8, are connected by a brake hanger rod 122 so as to hold these hanger arms in proper relation to the flanged car wheels 26. These cross rods 122 also form pivots for the brake shoes 123 which are shown as being of the clasp type and engage each car wheel 26 at its opposite sides. These shoes are drawn into engagement with the tires of the car wheels by drawing together the brake hanger rods 122 on opposite sides of each axle assembly. For this purpose each of these brake hanger rods 122 is shown as provided at its center with a horizontally inwardly projecting arm 125 having an opening 126 at its free end. The brake mechanism (not shown) for drawing each pair of these arms 125 together to apply the brakes and for separating these arms to release the brakes can be attached to these arms through the holes 126. The brake hanger rods 122 are also preferably reenforced by a truss 127 which is secured at its center to the corresponding arm 125 and at its ends to the brake hanger rod as illustrated in Fig. 4.

In the operation of the form of the invention shown in Figs. 1-9, upward movement of the end of any axle 25 effects a corresponding movement of its cradle 41, the ends of the axle being journaled in the end heads 40 of the cradle. This effects a corresponding upward movement of the axle pivot pin 55 carried by the axle bracket 53 formed integrally with each end head of the cradle 41 and thereby effects a corresponding upward movement of the shackles 90 and lever arm 80, this lever arm swinging about the axis of the tube 62 to which it is clamped. This tube 62 is journaled in the pair of spaced bearing heads 60, 60a secured to the underframe of the car body and its swinging movement is transmitted to the cylindrical end head or sleeve 106 which is welded to the tube 62. Since the ovalled live end 101 of the corresponding torsion rod 100 is anchored in the ovalled bore 105 in this end head or sleeve, the torsion rod is twisted, its ovalled dead end 102 being anchored in the corresponding anchor block 110 by the U-bolt 111. This twisting of the torsion rod 100 thereby yieldingly resists upward movement of the end of the axle and restores the axle to its original position.

It will be seen that when the end of the axle is so forced upwardly relative to the car body (or vice versa, when the car body is forced downwardly relative to the axle under the influence of momentum), the effective resilient opposing force of the torsion rod 100 increases at a geometric and not an arithmetic rate. This geometric rate is of the accelerated increased type in which increments of vertical movements of the axle are opposed by an accelerated rate of resilient resistance. This is primarily due to the progressive decrease in the effective length of the lever arm 80 as these lever arms swing upwardly and inwardly about the live end 101 of the torsion rod 100 and the tube 62 as an axis of rotation. This action is also influenced by the varying angularity of the shackles 90 and the fact that increments of vertical displacement of the lever arm pivot pins 81 at the outer ends of the lever arms 80 cause accelerated rates of increase in the angular displacement of the torsion rod 100. This latter is due to the fact that increments of vertical movement of the lever arm pivot pin 81 is not proportional to the accompanying increments of angular twist to which its corresponding torsion rod 100 is subjected.

This geometric action also occurs when the end of the axle moves downwardly relative to the car body from the normal position shown in Fig. 3. Throughout this particular movement, the geometric action is of the accelerated decrease type, that is, as the axle passes through increments of downward movement, the rate of decrease of the resilient force tending to push said axle downwardly increases. Thus, as the end of the axle moves downwardly from the position shown in Fig. 3, the resilient force tending to push it downwardly decreases at an accelerated rate.

It is to be noted that the shackles 90 of the axle spring suspensions incline upwardly and inwardly from the lever arm 80 to the axle pivot 55. This arrangement has two distinct advantages. One effect of this upward and inward angular shackle arrangement is that it causes each end of the car body to always tend to centralize itself. This centralizing tendency is caused by the effect of gravity which may be considered as a resilient, downwardly acting force acting between the body and the track bed and operating in a manner identical in its effects to a metal spring connecting the body and the track bed. It is to be distinctly understood that this force tending to centralize each end of the car body is of a resilient nature. Because of this fact the car body is not subjected to directly connected lateral forces as a consequence of a lateral axle movement. Such lateral axle movement occurs, for instance, in traversing curves in the track. In the conventional spring suspension all movements of the axle which are lateral with respect to the car body as a whole are transmitted directly to the car body. Because of the relatively large inertia of the latter, no appreciable lateral movement actually occurs when such a conventional vehicle is travelling at high speeds. What does occur is that the car body is subjected to a sharp lateral rap of considerable force every time the axle moves in a manner other than translationally. This not only seriously impairs the riding qualities of the vehicle, but also subjects the car body to a succession of forces which in a short period of time loosen body bolts and other such fastenings and cause the whole car body to rattle. Further, the provision of resilient cushioning of the lateral axle movement results in reduced power consumption, the positive resistance, directly by the entire car body, of lateral forces in conventional spring suspensions involving, of course, a power loss.

While rail cars do not have the high vertical wheel movements caused by rough roads, heavy lateral thrusts do develop when travelling on rails, due to many other causes. With the form of the invention shown in Figs. 1-9, it can be easily noted that all lateral thrusts directed against the axle and wheel assembly are resiliently resisted, except those resulting directly from the weight of the axle, wheels and cradle. In other words, when a train hits a curve at high speed, the weight of the car body will not produce a hammer-like blow against the wheels when the wheels are suddenly caused to move laterally. The wheels will start to move laterally and when the resiliently applied lateral pressure builds up high enough to move the car body laterally, the car body is moved as a result of a resilient force and not that of a hammer blow.

Another important advantage obtained by the angular arrangement of the shackles 90 is that it greatly reduces the possibility of wheel tramp. This latter may be broadly defined as a periodic vibration of the axle in a vertical transverse plane, the definition being usually limited to a rotary movement about an axis of rotation located at some remote point in the axle. In general, it may be said that, if one wheel is lifted, and if this movement causes a downward thrust on the opposite wheel, then wheel tramp results. Such wheel tramp is prevented in the present invention by insuring that the downward thrust of the axle pivot 55 lies at or outside of the vertical plane intersecting the contact of the wheel with the track. It will be noted that by arranging the linkage of the present spring suspension outside of the wheels, the downward thrust of each axle pivot 55 is well outside of the track. Therefore, the vertical upward thrust against one wheel is opposed by a directly opposite force passing through the corresponding axle pivot 55 and hence no downward thrust is imposed upon the opposite wheel as occurs in the conventional spring suspension.

It will also be seen that by arranging the linkage outside of the car wheels, the effective spring centers or suspension pivot points are at least 25% of the track width outside of the wheels at each side of the car body. With such wide effective spring centers, the result obtained when one wheel rises one inch is that there is a spring deflection of one and one-quarter inches. With a conventional spring suspension, with the effective spring centers well within the wheels, when one wheel rises one inch there is a spring deflection of substantially less than one inch. The suspension of the present invention, by virtue of the wide effective spring centers, which permit of the use of softer springs and still provides a marked increase in stability and a marked improvement in ride as compared with conventional trucks.

The high and wide suspension pivot positions of the suspension forming the subject of the present invention also eliminate the need for anti-body roll devices, such as torsion bar stabilizers and the like. By eliminating these anti-body roll controlling means the same or very similar frequencies can be maintained regarding body roll as are developed for vertical movements, thereby to greatly improve the ride characteristics of the suspension. A roll frequency and vertical frequency of around 70 cycles is desirable for optimum ride conditions. Such a frequency of 70 can safely be incorporated in the present suspension by virtue of the high and wide suspension pivot points which permit of the use of softer springs and through which the body is more nearly suspended than mounted. Anti-roll stabilizers build up spring rates against body roll and are not a cure, but a crutch, for improperly designed suspensions.

With the arrangement of the lever arm 80, lever arm pivot pin 91, shackles 90 and axle pivot pin 55 as shown, it will be seen that the line of pressure derived from the axle and directed against the lever arm pivot pin 81 is able to pass through the axis of rotation of the lever arm 80. In other words, the lever arm and its shackles are capable of straightening out. This provides a non-bottoming suspension since as the lever arm and shackles approach this straightened out position, the resilient resistance imposed by the torsion rod approaches infinity.

It will also be noted that the spring suspension forming the subject of the present invention does not involve axle compensation, that is, the distribution of the load equally to all of the wheels under all conditions of operation. Axle compensation, while a most valuable feature for heavy highway vehicles, is very undesirable in rail equipment, and does not lend for the optimum in stability and ride. While practically all present rail equipment suspensions incorporate axle compensation, in any properly sprung rail vehicle, axle compensation is not necessary or desirable because the road traveled over is not irregular enough to require it. In other words, it is desirable only where one wheel is constantly caused to rise at least an inch or more above its companion wheel which, of course, is not the case on rails.

Axle compensation decreases the stability of empty rail cars because it automatically produces effective spring centers equal to only one-half of the width of the track against instantaneous or sudden upward thrusts of a wheel. In other words, if a wheel suddenly moves upward one inch, assuming no body movement occurs, only one-half inch of spring deflection results. Therefore, the resistance to this wheel movement is only one-half inch of spring deflection at its given rate, and the energy stored to return said wheel is only that resulting from one-half inch of spring deflection.

Assuming the same spring rate per inch with the present suspension, when one wheel rises one inch there is a greater spring deflection than the wheel rise—in the order of one and one-quarter inches. As previously stated, such greater spring deflection is desirable to produce the desired ride and stability and as such spring deflections cannot be obtained with axle compensation, axle compensation is undesirable.

It will also be noted that all brake torque is resisted by the axle brackets, shackles, lever arms and their connecting pivots. Thus, by the wide spacing of the bearing heads 69, 60a and the bearings for the pivot pins 55 and 81, it will be seen that all brake torque is resisted directly by the linkage which connects each end of each axle with the car body and is not transmitted to the torsion rods.

With the cradle 41 shown in perspective in Fig. 9, it will be seen that the axle, wheels and bearings can be mounted or removed as a single unit, without disconnecting the cradle from the car body by the simple expedient of removing the clamp blocks 43. This cradle transmits the body load down to the ends of the axle. It will be noted that although the load is carried far out on the axle brackets 53 which form arms of the cradle, the bending movements caused by the overhang of these cradle arms or axle brackets are all taken care of in the cradle cross tubes 51. The final result to the axle is a vertical load at the normal positions plus a very soft resilient lateral connection between the axle and cradle assembly, and the car body.

The resilient shackles 90 allow a definite amount of axle movement longitudinally of the car frame. This allowable movement has two purposes. First, it helps to eliminate wheel hop or tramp and secondly, if properly designed will reduce the necessary structural strength of the entire suspension because of the following reasons:

The shackles should resist the axle movement longitudinally of the frame to the extent that with the normal maximum brake application the axle will move back only approximately one-eighth inch. This force is easily determined because it is around two-tenths of the vertical load applied to the rail by the wheel. However, should a pair of wheels leave the rails, or due to coupling impacts, this longitudinal force will go up many times higher. For this emergency purpose, the strong bumpers 115 and 117 are mounted on the car body and will come in contact with the end heads 40 of the cradle 41 when these longitudinal forces build up to twice that caused by braking. This design makes possible a great saving in unsprung weight because these excessive longitudinal forces will not go up through the axle brackets and suspension but directly through the suspension cradle to the bumpers which are a part of the sprung mass. These bumpers will not create noise in ordinary operation because they will never come in contact except in violent coupling, derailment or the like.

It is also to be noted in the present invention that the means whereby resilience is effected does not involve any frictional resistance such as occurs in the case of a conventional leaf spring, and hence is free and non-energy absorbing in its action. Also, having no frictional resistance, except bearings, which afford no particularly difficult lubrication problems, it does not vary because of change of frictional resistance as in the case of the conventional leaf spring.

It will also be seen that the cross tubes 51 of the cradle 41 forms an excellent mounting for the hangers for the brake shoes. To apply the brakes the companion arms 125 of each axle are drawn together by any suitable mechanism (not shown), this drawing the hanger rods 122 and hanger bars 120 together to apply the clasp brake shoes 123 to the peripheries of the corresponding pair of car wheels.

With the exception of the end heads for the cradle 41 and the shackles, the form of the invention shown in Fig. 10 employs the same form of cradle 41 and the same means connecting this cradle with the underframe 20 of the car as the form of the invention shown in Figs. 1–9 and the same reference numerals have therefore been applied to identical parts. The shackles, indicated at 90a, differ from the shackles 90 in the form of the invention shown in Figs. 1–9 in that they are rigid shackles and not resilient as with the shackles 90. Each end head 40a of the cradle 41 is also of somewhat different form from the end head 40 of the form of the invention shown in Figs. 1–9. As with the end head 40, the end head 40a is formed on its underside to provide a semicircular socket 42a and to the underside of this end head is removably secured a half round clamping block 43a which is generally similar to the half round clamping block 43 in the form of the invention shown in Figs. 1–9. The axle bracket 52a is, however, formed to provide an inwardly extending base portion 130, an intermediate vertical portion 131 and an upper horizontally outwardly extending portion 132. As with the form of the invention shown in Figs. 1–9, the axle pivot pin 55 is journaled in the outer extremity of the axle bracket. Each of these axle pivot pins is connected to the upper ends of a pair of shackles 90a which are similar to the shackles shown in Figs. 1–9 except that they are not built up of laminated strips and are not flexible.

In the form of the invention shown in Fig. 10 the axle 135 is shown as being non-rotatably mounted at each of its ends in an annular cushion 136 of rubber or other similar resilient material, each of these annular rubber cushions and the corresponding end of the axle being securely clamped in the socket 42a of the corresponding end head 40a of the cradle by the half round block 43a. The wheels 137 are shown as mounted for independent rotation on the axles 135. For this purpose the axle is provided with ends 138 of reduced diameter to provide a shoulder 139 against which the inner race 140 of an inner taper roller bearing 141 is seated. This roller bearing has an outer race 142 which is seated in a recess 143 in the hub 144 of the car wheel 137. Similarly, an outer taper roller bearing 145 is provided, the outer race 146 of which is seated in a recess 147 in the hub 144 of the car wheel 137 and the inner race 148 of which is held in position by nuts 150 screwed onto the ends of the axles. Inner and outer dust caps 151 and 152 can be secured to the hub 144 of the car wheel and engage the axle 135 to prevent the entrance of dust and dirt into the taper roller bearings 141 and 145.

In this form of the invention a rubber bumper or buffer block 155 is shown as secured to the exterior face of the intermediate part 131 of each axle bracket 52a in position to engage the hub of the lever arm 80 in the event that the axle assembly is moved laterally of the track beyond a predetermined extent. Since the maximum allowable lateral movement of the axles is definitely limited by the present tunnel widths and station platforms, the rubber bumpers or buffers 155 insure against the movement of the axles beyond these limits. Similarly, to positively limit the vertical movement of the axle assemblies, a rubber bumper or buffer 156 is shown as secured to the base portion 130 of the axle bracket in position to be engaged by the lever arm 80 when the car body is moved downwardly relative to the axles a predetermined distance. It will be seen that this bumper 156 thereby provides a resilient buffer for positively limiting the extreme downward movement of the car body or the extreme upward movement of the corresponding axle relative to each other.

The form of the invention shown in Fig. 11 shows a rubber mounting for each end of the axle used in conjunction with an axle having fixed car wheels.

With the exception of the end heads for the cradle 41 and the shackles, the form of the invention shown in Fig. 11 employs the same form of cradles 41 and the same means connecting this cradle with the underframe 20 of the car as in the form of the invention shown in Figs. 1–9 and the same reference numerals have therefore been applied to identical parts. The shackles, indicated at 90b, differ from the shackles 90 in the form of the invention shown in Figs. 1–9 in that they are rigid shackles and not resilient as with the shackles 90. Each end head 40b of the cradle 41 is also of somewhat different form from the end head 40 of the form of the invention shown in Figs. 1-9. As with the end head 40, the end head 40b is formed on its underside to provide a semicircular socket 42b and to the underside of this end head is removably secured a half round clamping block 43b which is generally similar to the half round clamping block 43. The end head 40b is also formed to provide an axle bracket 52b which is generally similar to the axle bracket 52 of the form of the invention shown in Figs. 1-9, having an upper outwardly extending part 53b carrying the axle pivot pin 55.

In this form of the invention shown in Fig. 11 the axle 160 is shown as having fixed car wheels 161 which ride upon the track and as having reduced ends 162 which carry inner and outer taper roller bearings 163 and 164, the axle being provided with end nuts 165 which hold these taper roller bearings in position. These taper roller bearings 163 and 164 are shown as embraced by a sleeve 170 which is surrounded by an annular cushion 171 of rubber or like resilient material, the sleeve 170 being recessed around its periphery to receive this annular rubber cushion. This annular rubber cushion 171 and the sleeve 170 are firmly clamped in the socket 42b of each end head 40b by the half round clamping block 43b. The end heads 40b can have rubber bumpers 155b similar to the bumpers 155 shown in Fig. 10.

The shackles 90a and 90b employed in the forms of the invention shown in Figs. 10 and 11 are of a rigid type, this being possible because of the introduction of the annular rubber cushions between the axle assembly and the cradle assembly. The use of the annular rubber cushions 171 in the form of the invention shown in Fig. 11 further eliminates the necessity for the spherical inner and outer rings 36 and 37 in each of the axle bearings of the form of the invention shown in Figs. 1-9 inasmuch as the annular rubber cushions 171 in the form of the invention shown in Fig. 11 provide for the desired self alinement of the axles relative to the cradles. It will be seen that the rubber mountings for the axle ends in the forms of the invention shown in Figs. 10 and 11 permit the necessary resiliently resisted movement of the axles lengthwise of the car body and thereby obviate the necessity for the resilient shackles 90.

From the foregoing it will be seen that the present invention provides an independent axle spring suspension for railroad passenger cars which provides the desirable ride characteristics, especially at high speed, and at the same time provides the necessary stability. It will further be seen that the present invention provides a suspension which is light in weight and will function to provide improved ride characteristics with little attention or danger of break-down.

I claim as my invention:

1. In a spring suspension for the frame of a railroad car body, a plurality of axles, a car wheel supporting each end of each of said axles, an axle bracket mounted on each end of each of said axles and having its upper end arranged above a horizontal plane intersecting the upper extremity of the adjacent wheel and outside of the vertical plane of the annular line of contact of said wheel with its rail, a plurality of lever arms fulcrumed on opposite sides of said body frame to swing about axes extending lengthwise of said body frame and each of said lever arms projecting horizontally outward from its connection with said frame, each lever arm being arranged adjacent one end of a corresponding axle and each having its free end arranged outside of the vertical plane of the annular line of contact of the corresponding car wheel with the railroad track, and means pivotally connecting said free end of each of said lever arms with said upper end of the corresponding axle bracket and extending upwardly from said lever arm to said axle bracket.

2. A spring suspension for the frame of a railroad car body, comprising a plurality of axles, a car wheel supporting each end of each of said axles, an axle bracket mounted on each end of each of said axles and having its upper end arranged above a horizontal plane intersecting the upper extremity of the rim of the adjacent wheel and outside of the vertical plane of the annular line of contact of the adjacent car wheel with its rail, a plurality of lever arms fulcrumed on opposite sides of said body frame to swing about axes extending longitudinally of said body frame and projecting outwardly from their points of fulcruming, each of said lever arms being arranged adjacent a corresponding end of one of said axles and outside of the vertical plane of the annular line of contact of the adjacent car wheel with its rail, a shackle pivotally connecting the free end of each of said lever arms with said upper end of the corresponding axle bracket and extending upwardly from said lever arm to the upper end of the corresponding bracket, each of said shackles being pivoted to swing in a plane extending transversely of said car body, and a plurality of torsion rods extending lengthwise of said body frame and each having a dead end anchored on said body frame and a live end operatively connected to the fulcrumed end of a corresponding lever arm to resist vertical movement of each of said axles independently of one another relative to said body frame.

3. In a spring suspension for the frame of a railroad car body, a plurality of axles, a car wheel supporting each end of each of said axles, an axle bracket mounted on each end of each of said axles and having its upper end arranged above a horizontal plane intersecting the upper extremity of the rim of the adjacent wheel and outside of the vertical plane of the annular line of contact of the adjacent car wheel with its rail, a pair of pivots at the upper end of each of said brackets and spaced a substantial distance from each other lengthwise of the body frame, a plurality of individual lever arm means each fulcrumed on one side of said body frame at spaced points longitudinally of said body frame to swing about an axis extending longitudinally of said body frame and each arranged in a plane below the upper end of the corresponding axle bracket, each of said lever arm means having its free end arranged outside of the vertical plane of the annular line of contact of the adjacent car wheel with the railroad track, a pair of pivots at the free end of each of said lever arm means and spaced a substantial distance from each other lengthwise of the body frame, and a pair of shackles spaced from each other lengthwise of the body frame and connecting one of the pivots of said lever arm means with the corresponding pivot of said axle bracket, each of said lever arm means and the corresponding pair of shackles being arranged in planes extending longitudinally of said body frame to resist substantially all brake torque reactions and longitudinal thrust from said axles to said body frame.

4. A spring suspension for the frame of a railroad car body, comprising a plurality of axles, a car wheel supporting each end of each of said axles, an axle bracket mounted on each end of each of said axles and projecting upwardly therefrom, a plurality of lever arms fulcrumed on said body frame and each having its free end extending horizontally outward and arranged outside of the vertical plane of the annular line of contact of a corresponding car wheel with the railroad track, a pin mounted at the outer end of said lever arm, a tension link directly connecting each of said lever arm pins with the upper end of the corresponding axle bracket so that the line of pressure derived from said axle bracket and directed against said pin is able to pass through the axis of said lever arm, and means for resiliently resisting rotation of each of said lever arms.

5. A spring suspension for the frame of a railroad car body, comprising an axle, a car wheel supporting each end of said axle, an end head supported by each end of said axle, members extending parallel with and on opposite sides of said axle and rigidly connecting said end heads with each other to provide a cradle assembly, a generally horizontal crank arm fulcrumed on said frame adjacent each of said end heads, means operatively connecting said cradle assembly with the free end of the corresponding crank arm, and means resiliently restraining rotation of said crank arm relative to said body frame.

6. A spring suspension for the frame of a railroad car body, comprising an axle, a car wheel supporting each end of said axle, an end head supported by each end of said axle, members extending parallel with and on opposite sides of said axle and rigidly connecting said end heads with each other to provide a cradle assembly, the upper part of each of said end heads being formed to provide an outwardly extending axle bracket, a generally horizontal crank arm fulcrumed on said frame adjacent each of said end heads, means for pivotally connecting the outer end of each of said axle brackets with the free end of the corresponding crank arm and permitting vertical movement of said cradle assembly relative to said body frame, and means resiliently restraining rotation of said crank arm relative to said body frame.

7. A laterally cushioned axle mounting between the wheeled axles and frame of a railroad car, comprising an axle bracket mounted on each end of each of said axles and having its upper end arranged above a horizontal plane intersecting the upper extremity of the rim of the adjacent wheel and arranged outside of the vertical plane of the annular line of contact of the adjacent car wheel with its rail, a normally generally horizontal crank arm pivotally mounted on said frame adjacent each end of each axle to swing about a horizontal axis extending transversely of said axle, a tension shackle pivoted at its lower end to said crank arm and at its upper end to said upper end of said axle bracket, said shackles and their pivotal connections being arranged outside of the vertical planes of the annular lines of contact of said car wheels with the railroad track, and spring means connected to said frame and each crank arm and tending to urge said crank arm and its shackle downwardly, said crank arms and shackles permitting cushioned movement of said axles laterally of the car body.

8. A laterally cushioned axle mounting between the wheeled axles and frame of a railroad car, comprising an axle bracket mounted on each end of each of said axles and having its upper end arranged above a horizontal plane intersecting the upper extremity of the rim of the adjacent wheel and arranged outside of the vertical plane of the annular line of contact of the adjacent car wheel with its rail, a normally generally horizontal crank arm pivotally mounted on said frame adjacent each end of each axle to swing about a horizontal axis extending transversely of said axle, a tension shackle pivoted at its lower end to said crank arm and at its upper end to said upper end of said axle bracket, said shackles and their pivotal connections being arranged outside of the vertical planes of the annular lines of contact of said car wheels with the railroad track, said shackles extending upwardly and inwardly from said crank arm to said upper end of said axle bracket, and spring means connected to said frame and each crank arm and tending to urge said crank arm and its shackle downwardly, said crank arms and shackles permitting cushioned movement of said axles laterally of the car body.

9. In a spring suspension for the body supporting frame of a railroad car, a plurality of axles, an axle bracket mounted on each end of each of said axles and having its upper end arranged outside of the vertical plane of the annular line of contact of the adjacent car wheel with its rail, a pair of pivots at the upper end of each of said brackets and spaced a substantial distance from each other lengthwise of the body frame, a plurality of individual lever arm means each fulcrumed on one side of said body frame at spaced points longitudinally of said body frame to swing about an axis extending longitudinally of said body frame and each arranged in a plane below the upper end of the corresponding axle bracket, a pair of pivots at the free end of each of said lever arm means and spaced a substantial distance from each other lengthwise of the body frame, a pair of shackles spaced from each other lengthwise of the body frame and connecting one of the pivots of said lever arm means with the corresponding pivot of said axle bracket, each of said lever arm means and the corresponding pair of shackles being arranged in planes extending longitudinally of said body frame to resist substantially all brake torque reactions and longitudinal thrust from said axles to said body frame, a torsion rod mounted on said frame and anchored thereto at one end and having its opposite end arranged substantially coaxial with the axis of rotation of said lever arm means, and means securing said opposite end of said torsion rod to said lever arm means to urge said lever arm means and its shackles downwardly, said lever arm means and shackles permitting cushioned movement of said axles laterally of the car body.

ALBERT F. HICKMAN.